United States Patent
Tawa et al.

(10) Patent No.: US 6,876,620 B2
(45) Date of Patent: Apr. 5, 2005

(54) OPTICAL STORAGE DEVICE

(75) Inventors: Fumihiro Tawa, Kawasaki (JP);
Shinya Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 87 days.

(21) Appl. No.: 10/624,148

(22) Filed: Jul. 21, 2003

(65) Prior Publication Data

US 2004/0017763 A1 Jan. 29, 2004

Related U.S. Application Data

(63) Continuation of application No. PCT/JP01/00691, filed on Feb. 1, 2001.

(51) Int. Cl.$^7$ ................................................. G11B 7/00
(52) U.S. Cl. ............... 369/112.01; 369/118; 369/44.24; 369/44.37
(58) Field of Search ....................... 369/112.01, 112.02, 369/112.27, 118, 44.11, 44.12, 44.14, 44.23, 44.24, 44.27, 44.37, 94

(56) References Cited

U.S. PATENT DOCUMENTS

| | | | | |
|---|---|---|---|---|
| 6,359,845 B1 | * | 3/2002 | Lee et al. | 369/44.23 |
| 6,590,851 B1 | * | 7/2003 | Kim et al. | 369/112.01 |
| 6,650,612 B1 | * | 11/2003 | Matsuzaki et al. | 369/112.05 |
| 6,728,193 B1 | * | 4/2004 | Uchizaki et al. | 369/112.01 |

FOREIGN PATENT DOCUMENTS

| | | |
|---|---|---|
| JP | 06-259804 | 9/1994 |
| JP | 09-270145 | 10/1997 |
| JP | 10-302289 | 11/1998 |
| JP | 10-320815 | 12/1998 |
| JP | 11-328716 | 11/1999 |
| JP | 2000-105943 | 4/2000 |
| JP | 2000-260052 | 9/2000 |
| JP | 2000-268391 | 9/2000 |
| JP | 2001-076371 | 3/2001 |

* cited by examiner

*Primary Examiner*—Muhammad Edun
(74) *Attorney, Agent, or Firm*—Greer, Burns & Crain, Ltd

(57) ABSTRACT

An optical storage device capable of at least reproducing information recorded on first and second optical storage media different in distance from a medium surface on which a light beam is incident to a recording surface and in operating wavelength. The optical storage device includes a first light emitting element for emitting a light beam having a first wavelength, a second light emitting element for emitting a light beam having a second wavelength, a first photodetector for detecting a reproduction signal from a light beam reflected on the first optical storage medium, a second photodetector for detecting a reproduction signal from a light beam reflected on the second optical storage medium, and a beam splitter for combining optical paths of the light beams emitted from the first and second light emitting elements. The optical storage device further includes an objective lens for optimally focusing the light beam emitted from the first light emitting element onto the first optical storage medium, and an optical element for producing a rotationally symmetrical aberration compensating for a wave aberration occurring on the second optical storage medium, in the light beam emitted from the second light emitting element.

11 Claims, 8 Drawing Sheets

OPTICAL STORAGE DEVICE

This is a continuation of International Application NO. PCT/JP01/00691, filed Feb. 1, 2001, which was not published in English.

BACKGROUND OF THE INVENTION

1. Field of the Invention

The present invention relates generally to an optical storage device, and more particularly to an optical pickup for an optical storage device.

2. Description of the Related Art

An optical disk inclusive of a magneto-optical disk has received attention as a memory medium that becomes a core in the recent rapid development of multimedia, and it is usually accommodated in a cartridge case to be provided as an optical disk cartridge for practical use. The optical disk cartridge is loaded into an optical disk drive to perform reading/writing of data from/to the optical disk by means of an optical pickup.

The optical pickup in a recent optical disk drive intended to realize size reduction is composed of a fixed optical assembly including a laser diode, a beam splitter for reflecting and transmitting a laser beam, and a photodetector for receiving reflected light from an optical disk, and a movable optical assembly including a carriage and an actuator mounted on the carriage and having an objective lens. The carriage is movable in the radial direction of the optical disk along a pair of rails by means of a voice coil motor (VCM).

A write-power laser beam emitted from the laser diode of the fixed optical assembly is first collimated by a collimator lens, next transmitted by the beam splitter, next reflected by a beam raising mirror of the actuator, and finally focused on the optical disk by the objective lens, thereby writing data onto the optical disk. On the other hand, data reading is performed by directing a read-power laser beam onto the optical disk. Reflected light from the optical disk is first collimated by the objective lens, next reflected by the beam splitter, and finally detected by the photodetector, thereby converting the detected optical signal into an electrical signal.

In such an optical pickup, it is generally required to reduce the spot size of a light beam focused on an optical disk for the purposes of high-density recording and reproduction of information. In reducing the spot size of the light beam, it is effective to increase the numerical aperture (NA) of an objective lens or shorten the wavelength of a light beam to be emitted from a light source such as a laser diode. However, if the wavelength of the light beam to be emitted from the light source is shortened, there arises a problem on compatibility between this optical disk using the light beam having the shorter wavelength and a conventional optical disk using a light beam having a longer wavelength. For example, in the case of increasing the numerical aperture (NA) of the objective lens, there is a problem that a coma due to inclination of an optical disk tends to occur. In this respect, an information recording and/or reproducing device (e.g., digital versatile disk drive (DVD drive)) using an optical disk thinner than the conventional optical disk is known. The optical disk used in this device has a transparent substrate or protective film thinner than that of the conventional optical disk (i.e., the distance from a disk surface on which light is incident and a recording surface is reduced). Further, in the case of shortening the wavelength of the light beam to be emitted from the light source, there is a problem that an aberration tends to occur even with the same thickness of an optical disk.

Thus, the recording density of an optical disk is increasing owing to the efforts made to reduce the beam spot size. However, it is difficult to rewrite all the information resources already stored on conventional disks to new optical disks. Therefore, the optical disk drive is required to include an optical pickup capable of also reading information recorded on the conventional optical disks.

An example of such an optical pickup is disclosed in Japanese Patent Laid-open No. Hei 7-182690. The optical pickup described in this publication includes a semiconductor laser as alight emitting element, a collimator lens, a beam splitter for combining/splitting light beams, an aberration adjusting lens, an objective lens, a detecting optical system, and a photodetector. The aberration adjusting lens is a concave lens for diverging a light beam directed toward the objective lens to increase a distance of beam convergence by the objective lens. The position of the aberration adjusting lens is switched by a mechanical moving mechanism according to the wavelength of a light beam to be used.

In the case of using an optical disk having a thinner substrate (protective film), the aberration adjusting lens is moved to fall outside the optical path of the light beam. The light beam emitted from the light emitting element is converted into a collimated beam by the collimator lens, and the collimated beam is next transmitted through the beam splitter to enter the objective lens. The light beam is next focused on the optical disk by the objective lens. The light beam reflected on the optical disk is converted into a collimated beam by the objective lens, and this collimated beam is next reflected by the beam splitter to pass through the detecting optical system and enter the photodetector, thereby reading information recorded on the optical disk.

In the case of using an optical disk having a thicker substrate, the aberration adjusting lens is moved to fall inside the optical path of the light beam. The light beam emitted from the light emitting element is converted into a collimated beam by the collimator lens, and the collimated beam is next transmitted through the beam splitter and the aberration adjusting lens to enter the objective lens. The light beam is next focused on the optical disk by the objective lens. The light beam reflected on the optical disk is converted into a collimated beam by the objective lens, and this collimated beam is passed through the aberration adjusting lens and next reflected by the beam splitter to pass through the detecting optical system and enter the photodetector, thereby reading information recorded on the optical disk. At this time, the distance between the aberration adjusting lens and the objective lens is maintained constant.

In this optical pickup, an aberration is corrected for the optical disks having different thicknesses by using the single objective lens. Accordingly, this optical pickup is less expensive and more convenient than the case of using two different optical pickups so designed as to respectively correspond to two kinds of optical disks having different thicknesses. However, this optical pickup requires the mechanical moving mechanism for moving the aberration adjusting lens. Further, since the distance and angle between the aberration adjusting lens and the objective lens must be maintained constant to correct for the aberration, a mechanism for moving the aberration adjusting lens to a precise position is also required, causing an increase in device cost.

Japanese Patent Laid-open No. 2000-132859 discloses another optical pickup capable of reading information recorded on two kinds of optical disks having different thicknesses by using a single objective lens. This optical pickup includes a first integrated element unit, a second integrated element unit, a collimator lens located on the back side (downstream side) of the first integrated element unit, a plano-convex lens with an aperture limiting member located on the back side of the second integrated element unit, a beam splitter for combining/splitting light beams, and an objective lens. The first integrated element unit includes a first light emitting element and a first photodetector. The second integrated element unit includes a second light emitting element and a second photodetector.

In the case of using an optical disk having a thinner transparent substrate (protective film), the light beam emitted from the first light emitting element is converted into a collimated beam by the collimator lens. This collimated beam is transmitted through the beam splitter, and is next focused on the optical disk by the objective lens. The light beam reflected on the optical disk is converted into a collimated beam by the objective lens, and this collimated beam is transmitted through the beam splitter to enter the first photodetector.

In the case of using an optical disk having a thicker substrate, the light beam emitted from the second light emitting element is converted into a light beam having outermost peripheral rays substantially parallel to the optical axis by the plano-convex lens for producing a concentric wave aberration, and this light beam is next limited in diameter to a value smaller than the aperture of the objective lens by the aperture limiting member. The light beam thus limited by the aperture limiting member is next reflected by the beam splitter, and is next focused on the optical disk by the objective lens. The light beam reflected on the optical disk is passed through the objective lens, and is next reflected by the beam splitter to enter the second photodetector. In this manner, the information recorded on each optical disk is read.

In the optical pickup described in this publication, it is not necessary to move the plano-convex lens as an aberration adjusting lens unlike the optical pickup described in Japanese Patent Laid-open No. Hei 7-182690 mentioned above. However, it is necessary to precisely set the distance and angle between the second light emitting element (laser diode) and the plano-convex lens. The plano-convex lens does not perfectly convert the light beam into a collimated beam, so that the aberration is optimally adjusted by using the objective lens. However, there arises a positioning error of the objective lens, and assembling tolerances are exacting.

Japanese Patent Laid-open No. 2000-99983 discloses another optical pickup capable of reading information recorded on two kinds of optical disks having different thicknesses. This optical pickup includes first and second light emitting elements provided on a common substrate, a parallel plane plate having a wavelength-selective film located downstream of the first and second light emitting elements, a beam splitter located downstream of the parallel plane plate, and a collimator lens located downstream of the beam splitter. A light beam reflected by the beam splitter is detected by a photodetector.

In the case of using an optical disk having a thinner transparent substrate (protective film), the light beam emitted from the first light emitting element is reflected on the front surface (wavelength-selective film) of the parallel plane plate, next transmitted through the beam splitter, and next converted into a collimated beam by the collimator lens. This collimated beam is next focused on the optical disk by the objective lens. The light beam reflected on the optical disk is converted into a collimated beam by the objective lens. This collimated beam is transmitted through the collimated lens, next reflected by the beam splitter to enter the photodetector.

In the case of using an optical disk having a thicker substrate, the light beam emitted from the second light emitting element is refracted on the front surface of the parallel plane plate, next reflected on the back surface of the parallel plane plate, and next refracted again on the front surface of the parallel plane plate to emerge therefrom. At this time, the optical path of the light beam emerged from the front surface of the parallel plane plate coincides with the optical path of the light beam emitted from the first light emitting element and reflected on the front surface of the parallel plane plate. The light beam emerged from the front surface of the parallel plane plate is transmitted through the beam splitter, and next converted into a collimated beam by the collimator lens. This collimated beam is next focused on the optical disk by the objective lens. The light beam reflected on the optical disk is converted into a collimated beam by the objective lens. This collimated beam is transmitted through the collimator lens, next reflected by the beam splitter to enter the photodetector.

In the case that the wavelengths of the light beams emitted from the first and second light emitting elements are close to each other, the light beams can be converted into collimated beams by the collimator lens. However, in the case that the wavelengths of the light beams are considerably different from each other, an aberration occurs even in focusing the light beam from the first or second light emitting element onto the optical disk by the objective lens. In some case, the aberration cannot be canceled depending upon the distance between the collimator lens and the objective lens. Unless the distance between the collimator lens and the objective lens is fixed, a signal recorded on the optical disk cannot be read.

SUMMARY OF THE INVENTION

It is therefore an object of the present invention to provide an optical storage device including an optical pickup which can form good beam spots with reduced aberrations on two kinds of optical storage media different in distance from a medium surface on which light is incident to a recording surface.

In accordance with an aspect of the present invention, there is provided an optical storage device capable of at least reproducing information recorded on first and second optical storage media different in distance from a medium surface on which a light beam is incident to a recording surface and in operating wavelength, the optical storage device including a first light emitting element for emitting a light beam having a first wavelength; a second light emitting element for emitting a light beam having a second wavelength different from the first wavelength; a first photodetector for detecting a reproduction signal from a light beam reflected on the first optical storage medium; a second photodetector for detecting a reproduction signal from a light beam reflected on the second optical storage medium; a first optical element for combining optical paths of the light beams emitted from the first and second light emitting elements; a first collimator lens located between the first light emitting element and the first optical element for collimating the light beam emitted from the first light emitting element; a second collimator lens located between the second light emitting element and the first optical element for collimating the light beam emitted from the second light emitting element; an objective lens located commonly on the optical paths combined by the first optical element for optimally focusing the light beam emitted from the first light emitting element onto the first optical storage medium; a second optical element located between the second light emitting element and the first optical element for producing a rotationally symmetrical aberration compensating for an aberration occurring on the second optical storage medium, in the light beam emitted from the second light emitting element; and an aperture limiting member for limiting the diameter of the light beam emitted from the second light emitting element.

The second optical element converts the light beam emitted from the second light emitting element into a light beam having a central ray lying on the optical axis of the second optical element and outermost peripheral rays parallel to or nearly parallel to the central ray. Preferably, the second optical element includes a plano-concave lens having a first plane surface on which the light beam collimated by the second collimator lens is incident, a second peripheral plane surface opposed to the first plane surface, and a central concave surface formed continuously to the second peripheral plane surface and opposed to the first plane surface, wherein peripheral rays of the light beam collimated by the second collimator lens are passed through the second peripheral plane surface of the plano-concave lens, and the remaining rays are passed through the central concave surface of the plano-concave lens. Preferably, the aperture limiting member includes a lens holder for holding the plano-concave lens.

In accordance with another aspect of the present invention, there is provided an optical storage device capable of at least reproducing information recorded on first and second optical storage media different in distance from a medium surface on which a light beam is incident to a recording surface and in operating wavelength, the optical storage device including a first light emitting element for emitting a light beam having a first wavelength; a second light emitting element for emitting a light beam having a second wavelength different from the first wavelength; a first photodetector for detecting a reproduction signal from a light beam reflected on the first optical storage medium; a second photodetector for detecting a reproduction signal from a light beam reflected on the second optical storage medium; an optical element for combining optical paths of the light beams emitted from the first and second light emitting elements; a first collimator lens located between the first light emitting element and the optical element for collimating the light beam emitted from the first light emitting element; a second collimator lens located between the second light emitting element and the optical element for collimating the light beam emitted from the second light emitting element; an objective lens located commonly on the optical paths combined by the optical element for optimally focusing the light beam emitted from the first light emitting element onto the first optical storage medium; a plano-concave reflecting mirror located between the optical element and the objective lens obliquely with respect to the optical paths combined by the optical element, the plano-concave reflecting mirror having a first plane surface on which the light beam collimated by the first or second collimator lens is incident, a second peripheral plane surface opposed to the first plane surface, and a central concave surface formed continuously to the second peripheral plane surface and opposed to the first plane surface; and an aperture limiting member for limiting the diameter of the light beam emitted from the second light emitting element; the plano-concave reflecting mirror further having a wavelength-selective reflecting film formed on the first plane surface for selectively reflecting the light beam having the first wavelength and transmitting the light beam having the second wavelength and a total-reflection film formed on the second peripheral plane surface and the central concave surface; the plano-concave reflecting mirror producing a rotationally symmetrical aberration compensating for an aberration occurring on the second optical storage medium, in the light beam emitted from the second light emitting element.

Preferably, peripheral rays of the light beam collimated by the second collimator lens are reflected on the second peripheral plane surface of the plano-concave reflecting mirror, and the remaining rays are reflected on the central concave surface of the plano-concave reflecting mirror.

In accordance with a further aspect of the present invention, there is provided an optical storage device capable of at least reproducing information recorded on first and second optical storage media different in distance from a medium surface on which a light beam is incident to a recording surface and in operating wavelength, the optical storage device including a first light emitting element provided on a substrate for emitting a light beam having a first wavelength; a second light emitting element provided on the substrate for emitting a light beam having a second wavelength different from the first wavelength; a first photodetector provided on the substrate for detecting a reproduction signal from a light beam reflected on the first optical storage medium; a second photodetector provided on the substrate for detecting a reproduction signal from a light beam reflected on the second optical storage medium; a collimator lens for collimating the light beam emitted from the first light emitting element; an objective lens located downstream of the collimator lens for optimally focusing the light beam emitted from the first light emitting element onto the first optical storage medium; and a plano-concave reflecting mirror located between the first and second light emitting elements and the collimator lens obliquely with respect to optical paths of the light beams emitted from the first and second light emitting elements, the plano-concave reflecting mirror having a first plane surface on which the light beam emitted from the first or second light emitting element is incident, a second peripheral plane surface opposed to the first plane surface, and a central concave surface formed continuously to the second peripheral plane surface and opposed to the first plane surface; the plano-concave reflecting mirror further having a wavelength-selective reflecting film formed on the first plane surface for selectively reflecting the light beam having the first wavelength and transmitting the light beam having the second wavelength and a total-reflection film formed on the second peripheral plane surface and the central concave surface; the second light emitting element being located at a position far from the focal point of the collimator lens by a first predetermined distance in a first direction and spaced a second predetermined distance in a second direction perpendicular to the first direction so that the central ray of the light beam emitted from the second light emitting element and next reflected by the plano-concave reflecting mirror coincides with the optical axis of the collimator lens.

Preferably, peripheral rays of the light beam emitted from the second light emitting element are reflected on the second peripheral plane surface of the plano-concave reflecting mirror, and the remaining rays are reflected on the central concave surface of the plano-concave reflecting mirror.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
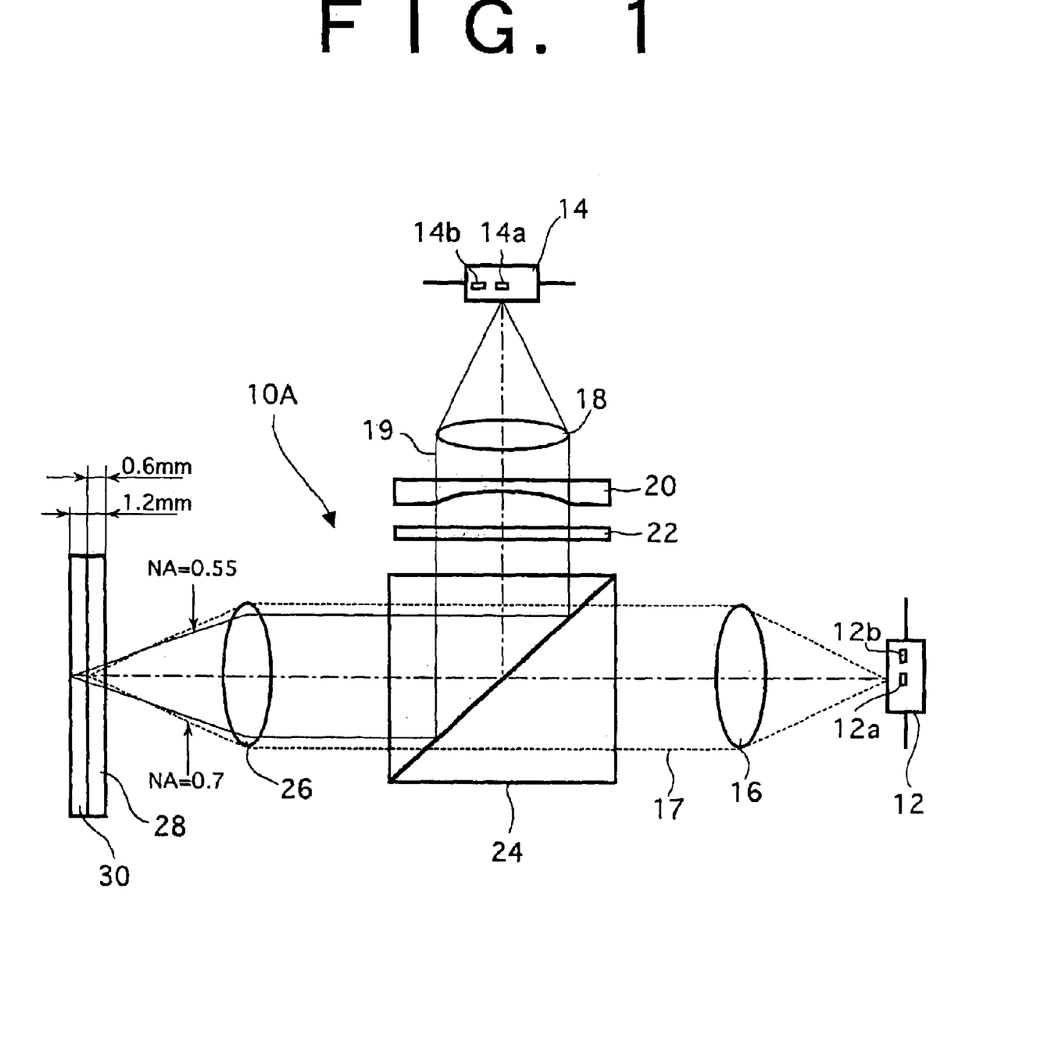
FIG. 1 is a schematic diagram of an optical pickup according to a first preferred embodiment of the present invention.

Referring to FIG. 1, there is shown a schematic diagram of an optical pickup 10A according to a first preferred embodiment of the present invention. The optical pickup 10A has a first integrated element unit 12 for a wavelength of 410 nm and a second integrated element unit 14 for a wavelength of 680 nm. The first integrated element unit 12 has a first light emitting element 12a such as a laser diode for emitting a light beam having a wavelength of 410 nm and a first photodetector 12b such as a photodiode. Similarly, the second integrated element unit 14 has a second light emitting element 14a such as a laser diode for emitting a light beam having a wavelength of 680 nm and a second photodetector 14b such as a photodiode. The wavelengths of the light beams to be emitted from the first and second light emitting elements 12a and 14a are suitably selectable according to the kind of a recording medium.

The light beam emitted from the first light emitting element 12a is converted into a collimated beam 17 by a first collimator lens 16 for a wavelength of 410 nm, and the collimated beam 17 next enters a wavelength-selective beam splitter 24. The numerical aperture (NA) of the first collimator lens 16 is 0.2, and the beam diameter of the collimated beam 17 is 4 mm. The first collimator lens 16 is located so that the light emission point of the first light emitting element 12a coincides with the focal point of the first collimator lens 16.

The beam splitter 24 has a characteristic of transmitting a light beam having a wavelength of 410 nm and reflecting a light beam having a wavelength of 680 nm. Accordingly, the collimated beam 17 is transmitted through the wavelength-selective beam splitter 24, and is next focused on a recording surface of an optical disk 28 having a 0.6 mm thick transparent substrate (transparent protective film) by an objective lens 26 having a numerical aperture (NA) of 0.7. In other words, the objective lens 26 is designed so that when a light beam having a wavelength of 410 nm enters the objective lens 26, a microscopic beam spot is formed on the recording surface of the optical disk 28 whose transparent substrate is thinner with no aberrations.

On the other hand, the light beam emitted from the second light emitting element 14a is converted into a collimated beam 19 by a second collimator lens 18 for a wavelength of 680 nm. In other words, the second collimator lens 18 is located so that the light emission point of the second light emitting element 14a coincides with the focal point of the second collimator lens 18. A plano-concave lens 20 is located on the back side (downstream side) of the second collimator lens 18. The plano-concave lens 20 functions to produce a rotationally symmetrical aberration as canceling an aberration occurring in focusing the light beam emerged from the second collimated lens 18 on a recording surface of an optical disk 30 having a 1.2 mm thick transparent substrate by the objective lens 26.

The objective lens 26 is an objective lens for a wavelength of 410 nm. Accordingly, if the plano-concave lens 20 is not provided, there occurs an aberration on the optical disk 30 when the collimated beam 19 emerged from the second collimator lens 18 is focused on the recording surface of the optical disk 30 whose transparent substrate is thicker by the objective lens 26. As a result, a microscopic beam spot is not formed on the recording surface of the optical disk 30, and information cannot therefore be read from the recording surface of the optical disk 30. The aberration is caused not only by the difference in thickness between the transparent substrates of different optical disks, but also by the difference in refractive index or wavelength.

An aperture limiting member 22 is located downstream of the plano-concave lens 20. By passing the collimated beam 19 through the aperture limiting member 22, the beam diameter of the collimated beam 19 is limited to 3.3 mm. The aperture limiting member 22 functions to limit the beam diameter of the light beam passed through the plano-concave lens 20 and thereby limit the numerical aperture (NA) of the light beam to be focused on the optical disk 30 by the objective lens 26. The numerical aperture (NA) of the light beam emitted from the second light emitting element 14a and focused on the optical disk 30 is smaller than the numerical aperture (NA) of the light beam emitted from the first light emitting element 12a, so that the aperture diameter of the aperture limiting member 22 is smaller than the aperture diameter of the objective lens 26. In the case that the numerical aperture (NA) of the light beam emitted from the first light emitting element 12a and focused on the optical disk 30 is smaller than the numerical aperture (NA) of the light beam emitted from the second light emitting element 14a and focused on the optical disk 30, an additional aperture limiting member is also required for the first light emitting element 12a.

The plano-concave lens 20 and the aperture limiting member 22 will now be described in more detail with reference to FIG. 2. The plano-concave lens 20 has a first plane surface 20a on which the collimated beam 19 is incident, a second peripheral plane surface 20b opposed to the first plane surface 20a, and a central concave surface 20c formed continuously to the second peripheral plane surface 20*b* and opposed to the first plane surface 20*a*. The thickness of the plano-concave lens 20 is 2 mm. The aspherical coefficients of the plano-concave lens 20 are R=109.8, K=1658.721, A=−0.9216E−3, B=0.2498E−4, C=−0.416824E−4, D=0.113787E−4, and E=−0.118170E−5. The plano-concave lens 20 is arranged so that the first plane surface 20*a* is opposed to the second collimator lens 18 and the distance between the vertex of the second collimator lens 18 and the first plane surface 20*a* is 7.65 mm.

Figure 2:
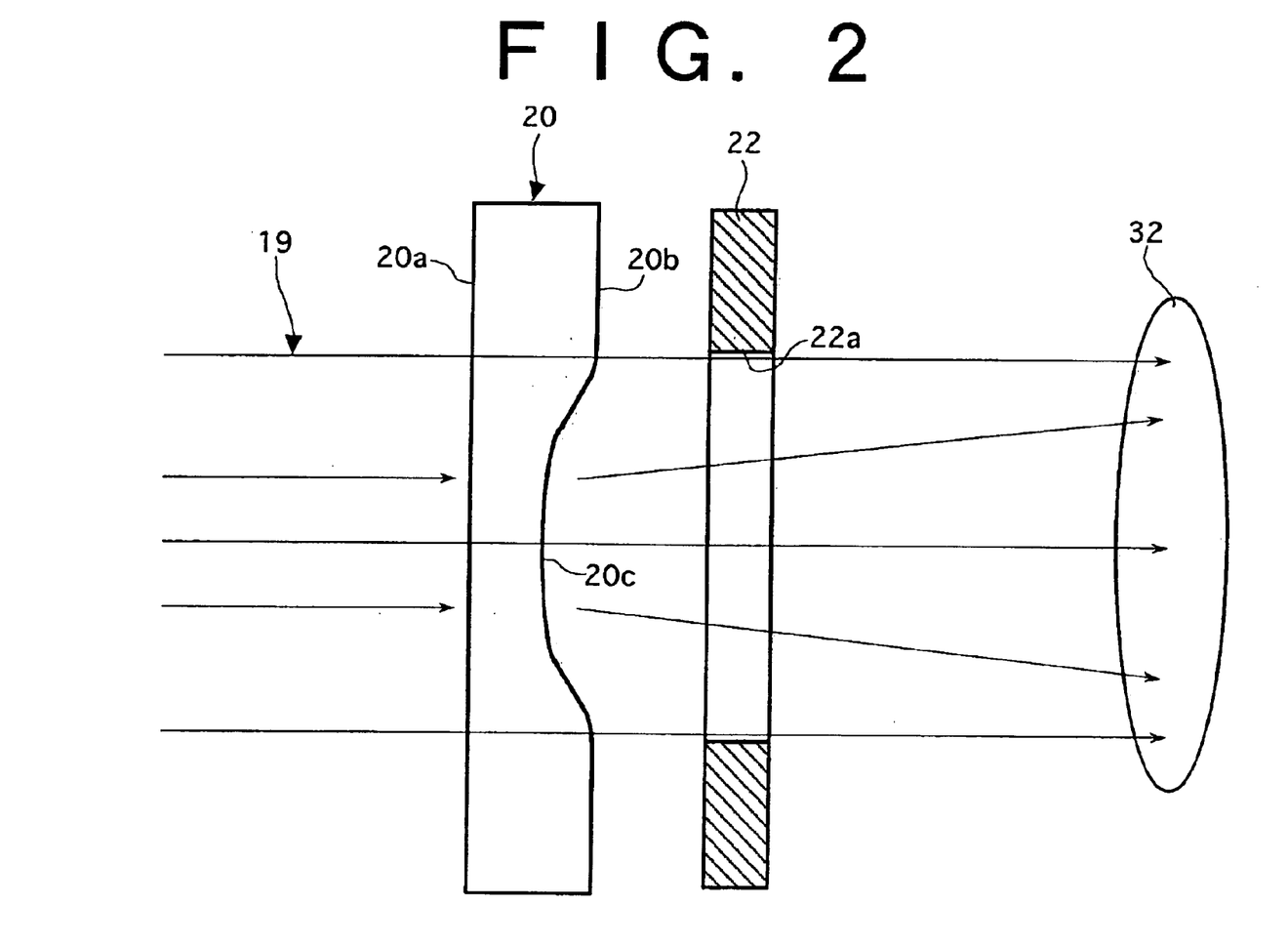
FIG. 2 is a diagram illustrating the operations of a plano-concave lens and an aperture limiting member.

As shown in FIG. 2, a peripheral portion of the plano-concave lens 20 at a given radial position limited by the aperture limiting member 22 is a parallel plane plate such that the first plane surface 20*a* and the second peripheral plane surface 20*b* are parallel to each other. In other words, the second peripheral plane surface 20*b* through which the outermost peripheral rays of the collimated beam 19 are passed is a surface perpendicular to the optical axis. The outermost peripheral rays of the collimated beam 19 limited by the aperture limiting member 22 are passed through the second peripheral plane surface 20*b* of the plano-concave lens 20, and the remaining rays of the collimated beam 19 are passed through the central concave surface 20*c*. Accordingly, the outermost peripheral rays of the collimated beam 19 limited by the aperture limiting member 22 and the central ray lying on the optical axis are parallel to each other, and a rotationally symmetrical aberration is produced between the optical axis and the outermost peripheral rays. Thus, the optical beam emerged from the plano-concave lens 20 includes this rotationally symmetrical aberration.

As shown in FIGS. 1 and 2, the emergent light from the plano-concave lens 20 is a collimated beam. Accordingly, it is not necessary to severely specify the distance between the plano-concave lens 20 and the objective lens 26, and the plano-concave lens 20 can be located at a fixed position. As shown in FIG. 2, the aperture limiting member 22 has an aperture 22*a*. Reference numeral 32 denotes a traveling direction of the rays passed through the plano-concave lens 20. The aperture limiting member 22 may be replaced by a lens holder for holding the plano-concave lens 20.

Figure 3A:
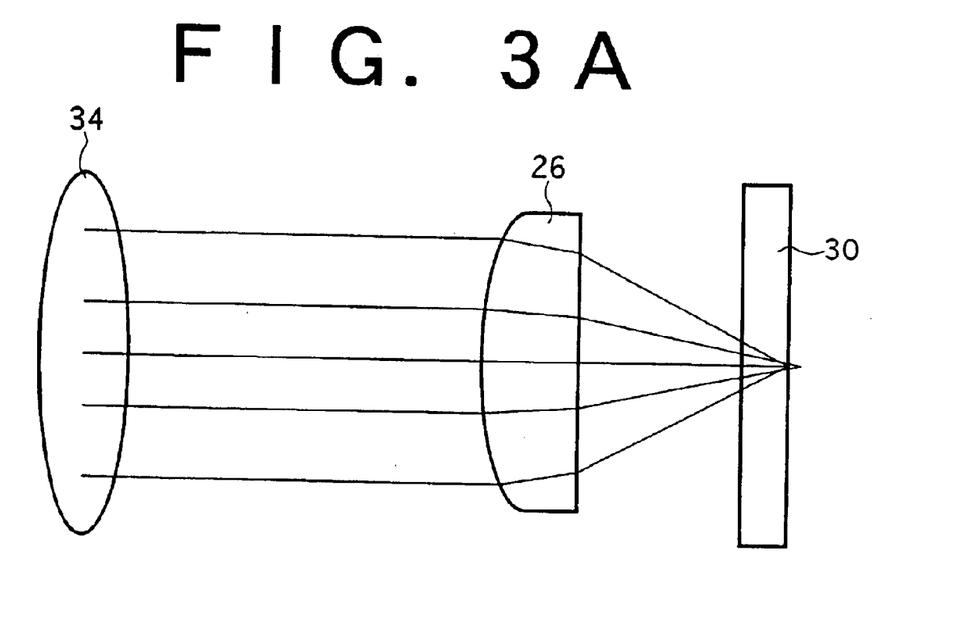
FIG. 3A is a diagram showing a traveling direction of a wavefront of a light beam in an optical pickup having no plano-concave lens.
Figure 3B:
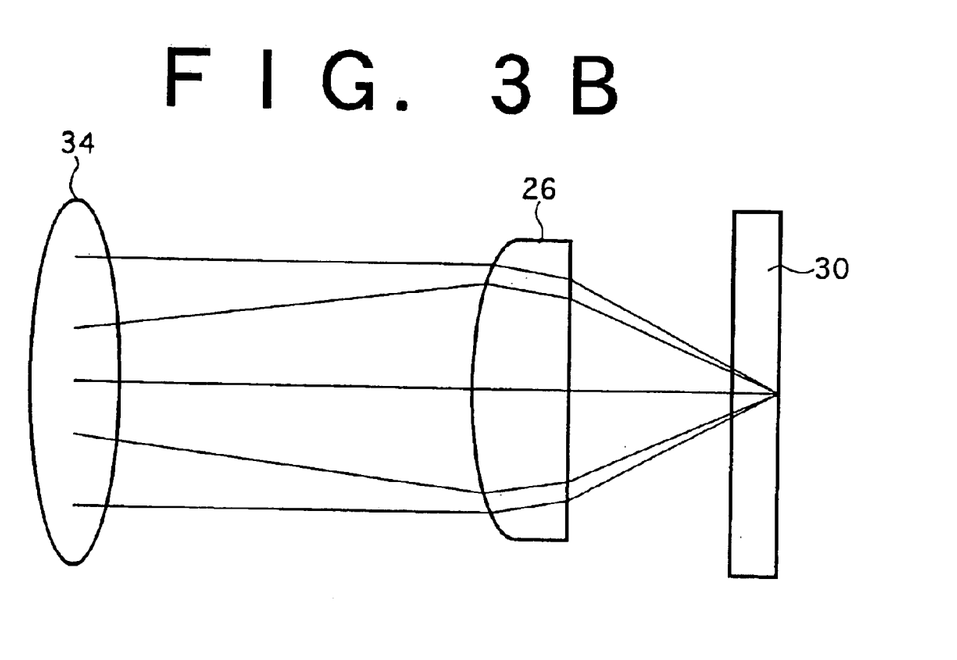
FIG. 3B is a diagram showing an aberration produced by a plano-concave lens as a traveling direction of a wavefront.

FIG. 3A shows a traveling direction 34 of rays in the case that the plano-concave lens 20 is not provided. As apparent from FIG. 3A, a microscopic beam spot cannot be formed on the recording surface of the optical disk 30 by the objective lens 26. FIG. 3B shows an aberration produced by the plano-concave lens 20 as a traveling direction of a wavefront. The plano-concave lens 20 produces a rotationally symmetrical aberration as compensating for an aberration occurring on the optical disk 30 in using the objective lens 26, so that a microscopic beam spot can be formed on the recording surface of the optical disk 30 by the objective lens 26. An angular deviation of the rays having the rotationally symmetrical aberration from the optical axis is less than 1°.

In the case of using the optical disk 28 whose transparent substrate has a thickness of 0.6 mm, the first integrated element unit 12 is used. The light beam emitted from the first light emitting element 12*a* is converted into the collimated beam 17 by the first collimator lens 16, and the collimated beam 17 is transmitted through the beam splitter 24 and next focused on the optical disk 28 by the objective lens 26 to form a microscopic beam spot. The light beam reflected on the optical disk 28 is converted into a collimated beam by the objective lens 26, and this collimated beam is transmitted through the beam splitter 24 and next focused on the first photodetector 12*b* by the first collimator lens 16, thus reading the information recorded on the optical disk 28.

In the case of using the optical disk 30 whose transparent substrate has a thickness of 1.2 mm, the second integrated element unit 14 is used. The light beam emitted from the second light emitting element 14*a* is converted into the collimated beam 19 by the second collimator lens 18, and the collimated beam 19 is transmitted through the plano-concave lens 20 and the aperture limiting member 22. The light beam emerged from the aperture limiting member 22 is reflected by the beam splitter 24 and next focused on the recording surface of the optical disk 30 by the objective lens 26 to form a microscopic beam spot. The light beam reflected on the optical disk 30 is converted into a collimated beam by the objective lens 26, and this collimated beam is reflected by the beam splitter 24 and next transmitted through the aperture limiting member 22 and the plano-concave lens 20. The light beam emerged from the plano-concave lens 20 is next focused on the second photodetector 14*b* by the second collimator lens 18, thus reading the information recorded on the optical disk 30. The beam diameter of the light beam emitted from the second light emitting element 14*a* is limited to 3.3 mm by the aperture limiting member 22, so that the numerical aperture (NA) of the objective lens 26 for this light beam is 0.55.

In the optical pickup 10A according to this preferred embodiment, the distance between the plano-concave lens 20 and the objective lens 26 is 20 mm for the optical disk 30 whose transparent substrate has a thickness of 1.2 mm, and a good aberration of 0.07 λ or less can be obtained in the range of −20 mm to +20 mm for the seek distance of the objective lens 26. In this case, the angle of the outermost peripheral rays of the light beam between the plano-concave lens 20 and the objective lens 26 with respect to the optical axis is 1° or less.

Figure 4:
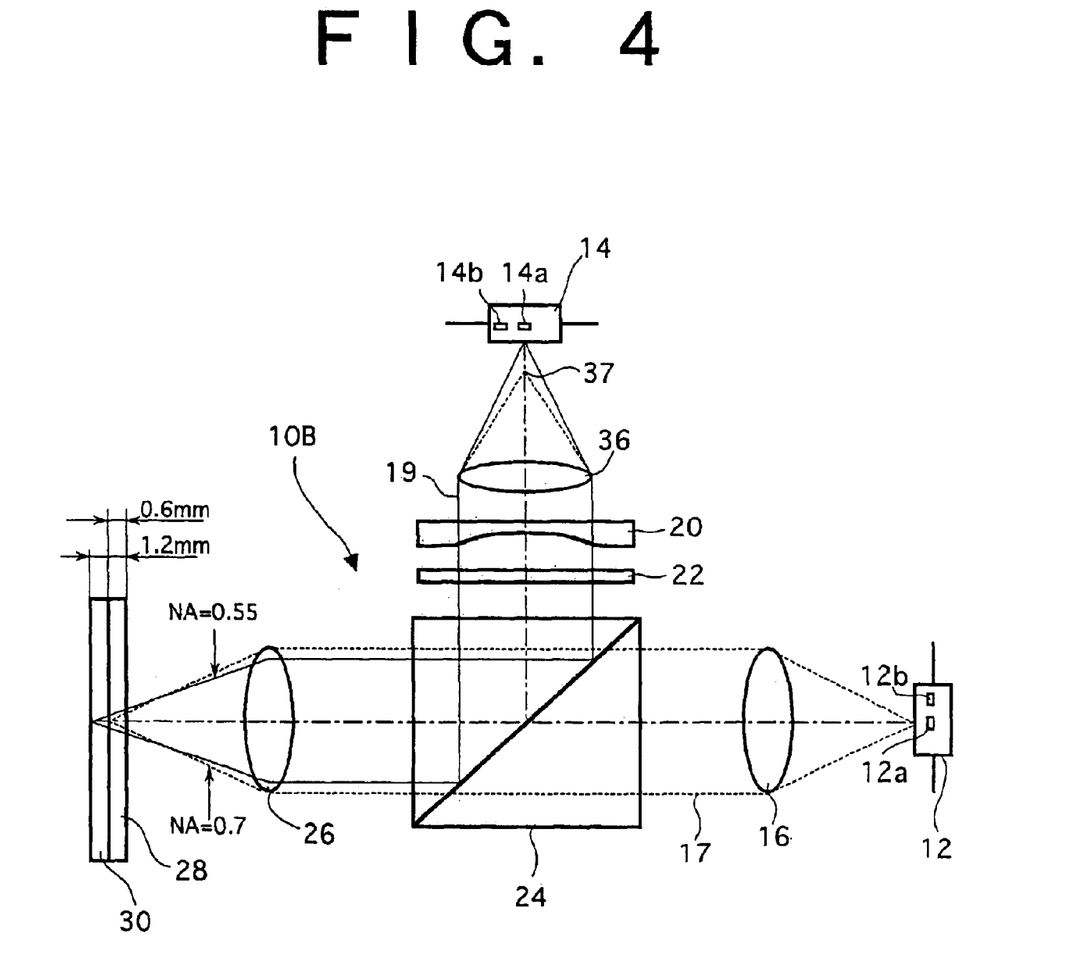
FIG. 4 is a schematic diagram of an optical pickup according to a second preferred embodiment of the present invention.

Referring to FIG. 4, there is shown a schematic diagram of an optical pickup 10B according to a second preferred embodiment of the present invention. In the description of this preferred embodiment and the description of preferred embodiments subsequent thereto, substantially the same components as those of the first preferred embodiment shown in FIG. 1 are denoted by the same reference numerals, and the description thereof will be partially omitted to avoid duplication. The optical pickup 10B according to the second preferred embodiment is similar to the optical pickup 10A according to the first preferred embodiment shown in FIG. 1 except that a collimator lens 36 having the same design as that of the first collimator lens 16 is located in place of the second collimator lens 18 shown in FIG. 1 and that the second light emitting element 14*a* is located at a position far from a focal point 37 of the second collimator lens 36 by a predetermined distance. For example, in the case of using a collimator lens for a wavelength of 410 nm having properties of f=8.0 mm, NA=0.2, and n=1.604 as the second collimator lens 36, the second light emitting element 14*a* is located at a position far from the focal point 37 of the second collimator lens 36 by a distance of about 0.248 mm.

The light beam emitted from the second light emitting element 14*a* is substantially converted into the collimated beam 19 by the second collimator lens 36. The rays passed through the second collimator lens 36 at its radial positions within the same aperture diameter as that of the aperture limiting member 22 are incident on the plano-concave lens 20 in parallel to the optical axis, and the light beam limited in beam diameter by the aperture limiting member 22 is reflected by the beam splitter 24 to enter the objective lens 26. Then, the incident light beam is focused on the recording surface of the optical disk 30 by the objective lens 26 to form a microscopic beam spot. According to this preferred embodiment, the first and second collimator lenses 16 and 36 can be used commonly.

Figure 5:
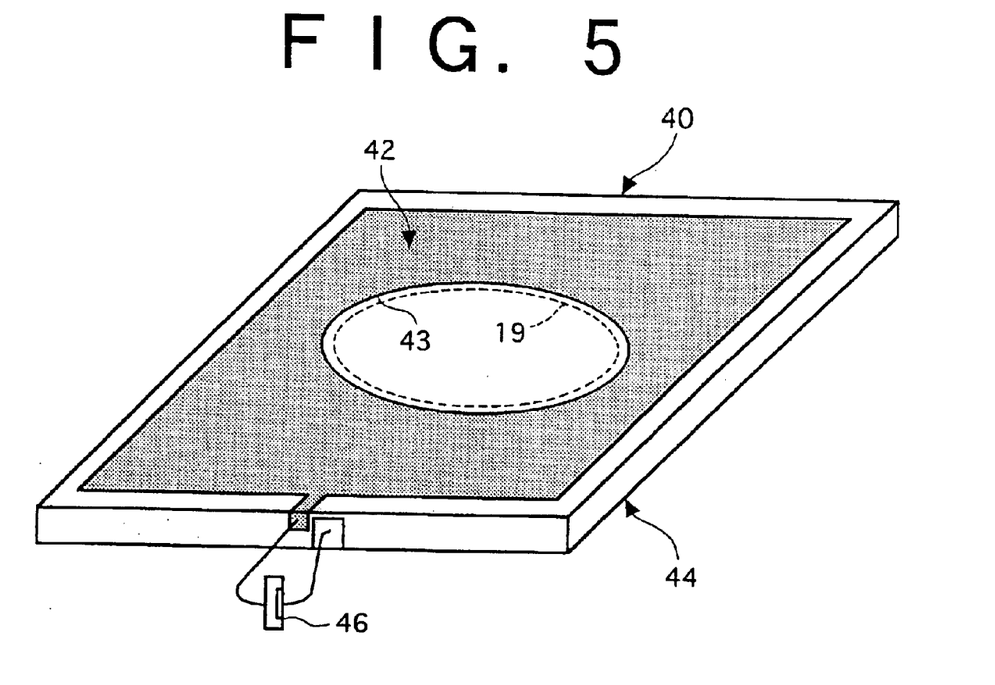
FIG. 5 is a schematic perspective view of a liquid crystal unit suitable for production of a rotationally symmetrical aberration.
Figure 6:
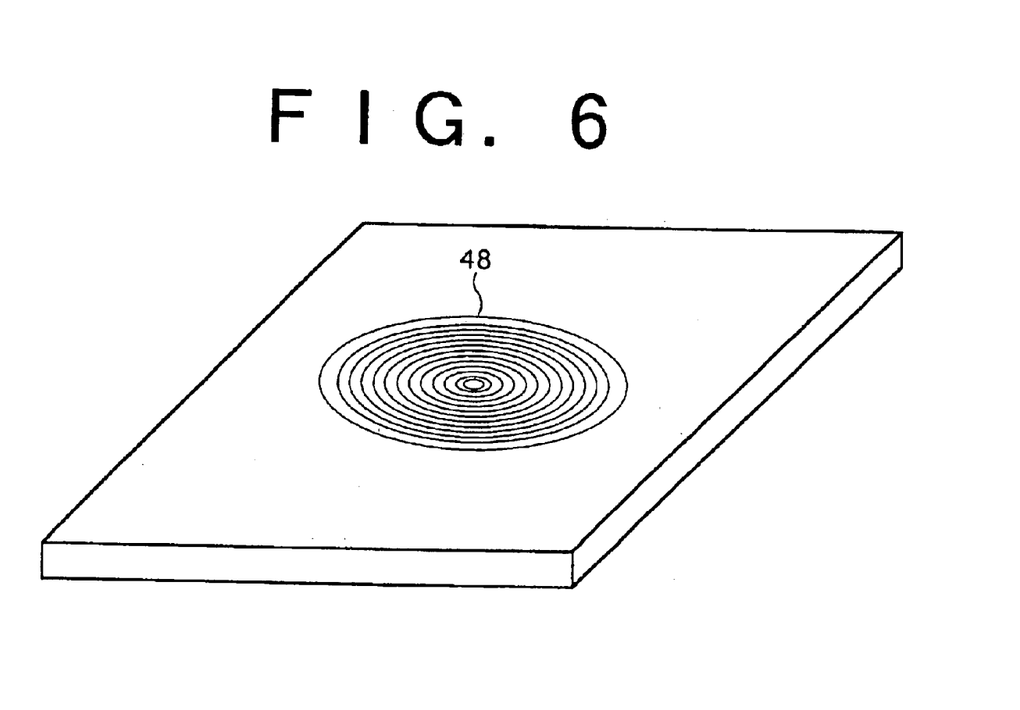
FIG. 6 is a schematic perspective view of a hologram suitable for production of a rotationally symmetrical aberration.

While each of the first and second preferred embodiments employs the plano-concave lens 20 as an optical element for producing a rotationally symmetrical aberration, the plano-concave lens 20 may be replaced by a liquid crystal unit 40 shown in FIG. 5 or a hologram 48 shown in FIG. 6. The liquid crystal unit 40 shown in FIG. 5 includes an aperture electrode 42 having an aperture 43 on the front side and a transparent electrode 44 on the back side. A voltage is applied between the aperture electrode 42 and the transparent electrode 44 by a power source 46. A light beam is passed through the aperture 43 of the aperture electrode 42. Reference numeral 19 denotes a beam diameter. The diameter of the aperture 43 of the aperture electrode 42 is set different from the beam diameter 19 for the following reason. When the applied voltage is increased, the orientation of liquid crystals is saturated and the refractive index of the liquid crystals changes toward a central portion. It is intended to form a region where there is no refractive index difference in a peripheral portion. In other words, it is intended to form a region having no refractive index difference in the peripheral portion which region corresponds to a region where the slope is zero in the case of a curved surface. On the other hand, the hologram 48 shown in FIG. 6 has a plurality of circular groove patterns whose pitch is larger at central and peripheral portions and smaller at an intermediate portion.

Figure 7:
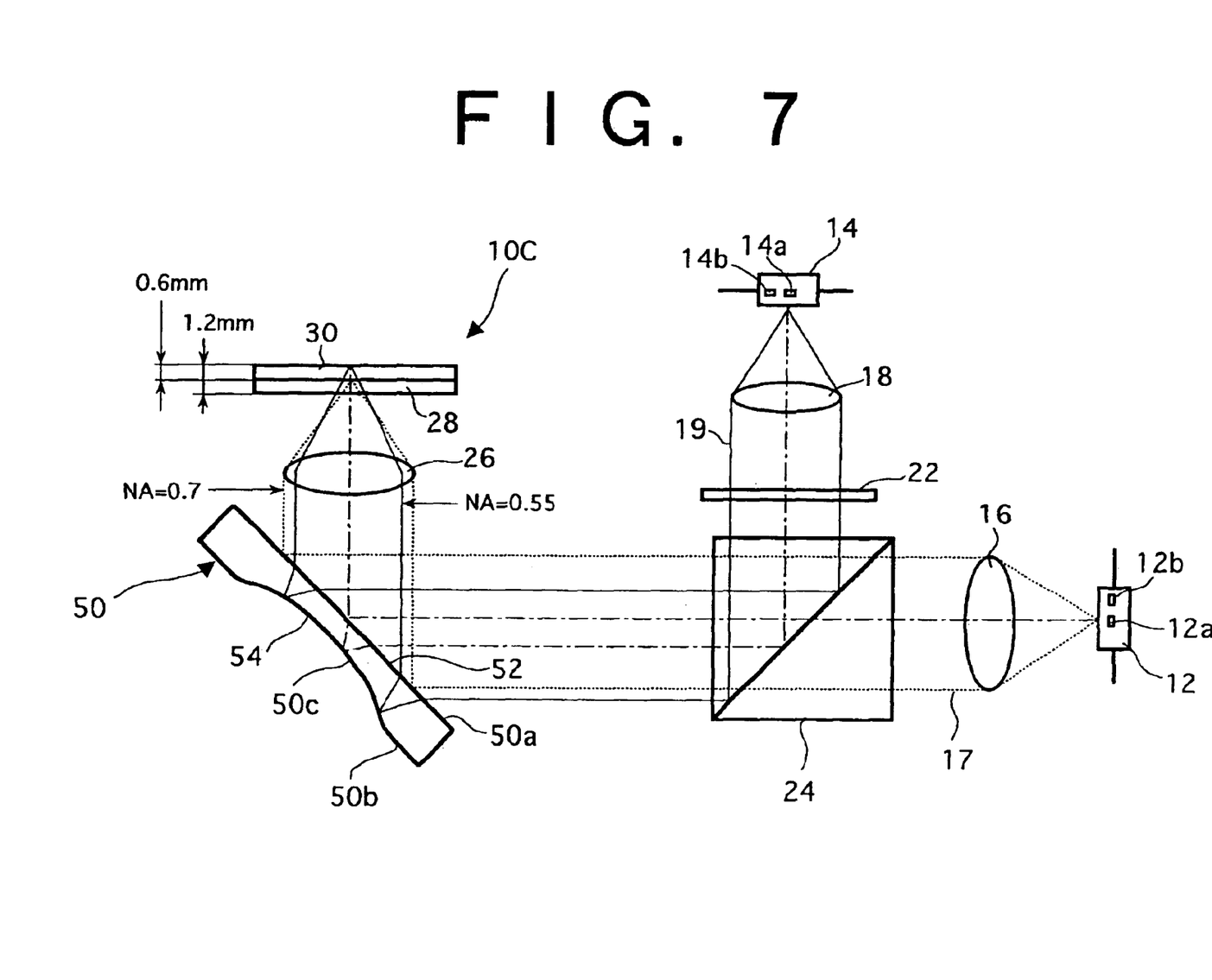
FIG. 7 is a schematic diagram of an optical pickup according to a third preferred embodiment of the present invention.

Referring to FIG. 7, there is shown a schematic diagram of an optical pickup 10C according to a third preferred embodiment of the present invention. In this preferred embodiment, a plano-concave reflecting mirror 50 is used as an optical element for producing a rotationally symmetrical aberration. The plano-concave reflecting mirror 50 has a first plane surface 50a on which the light beam collimated by the first or second collimator lens 16 or 18 is incident, a second peripheral plane surface 50b opposed to the first plane surface 50a, and a central concave surface 50c formed continuously to the second peripheral plane surface 50b and opposed to the first plane surface 50a. A wavelength-selective reflecting film 52 having a characteristic of reflecting a light beam having a wavelength of 410 nm and transmitting a light beam having a wavelength of 680 nm is formed on the first plane surface 50a of the plano-concave reflecting mirror 50. The wavelength-selective reflecting film 52 is formed from a dielectric multilayer film, for example. A total-reflection film 54 is formed on the second peripheral plane surface 50b and the central concave surface 50c of the plano-concave reflecting mirror 50. The total-reflection film 54 is preferably provided by a wavelength-selective reflecting film for reflecting only light having a wavelength of 680 nm.

The light beam emitted from the first light emitting element 12a is converted into a collimated beam 17 by the first collimator lens 16. The collimated beam 17 is transmitted through the beam splitter 24 and next reflected on the wavelength-selective reflecting film 52 formed on the first plane surface 50a of the plano-concave reflecting mirror 50. The collimated beam 17 is next focused on the recording surface of the optical disk 28 by the objective lens 26 to form a microscopic beam spot. On the other hand, the light beam emitted from the second light emitting element 14a is converted into a collimated beam 19 by the second collimator lens 18. The collimated beam 19 is next limited in beam diameter by the aperture limiting member 22. The collimated beam 19 emerged from the aperture limiting member 22 is reflected by the beam splitter 24 to enter the plano-concave reflecting mirror 50. The light beam incident on the mirror 50 is refracted by the first plane surface 50a and next reflected on the total-reflection film 54. At this time, the reflected light on the total-reflection film 54 is so modulated as to produce a rotationally symmetrical aberration as compensating for an aberration of a beam spot to be formed on the optical disk 30 by the objective lens 26.

The light beam reflected on the total-reflection film 54 of the plano-concave reflecting mirror 50 is refracted again by the first plane surface 50a, and next focused on the recording surface of the optical disk 30 by the objective lens 26. The second light emitting element 14a and the second collimator lens 18 are arranged so that the central ray of the light beam emitted from the first light emitting element 12a and reflected on the front surface of the plano-concave reflecting mirror 50 coincides with the central ray of the light beam emitted from the second light emitting element 14a, refracted on the front surface of the plano-concave reflecting mirror 50, totally reflected on the back surface of the mirror 50, and refracted again on the front surface of the mirror 50.

Figure 8:
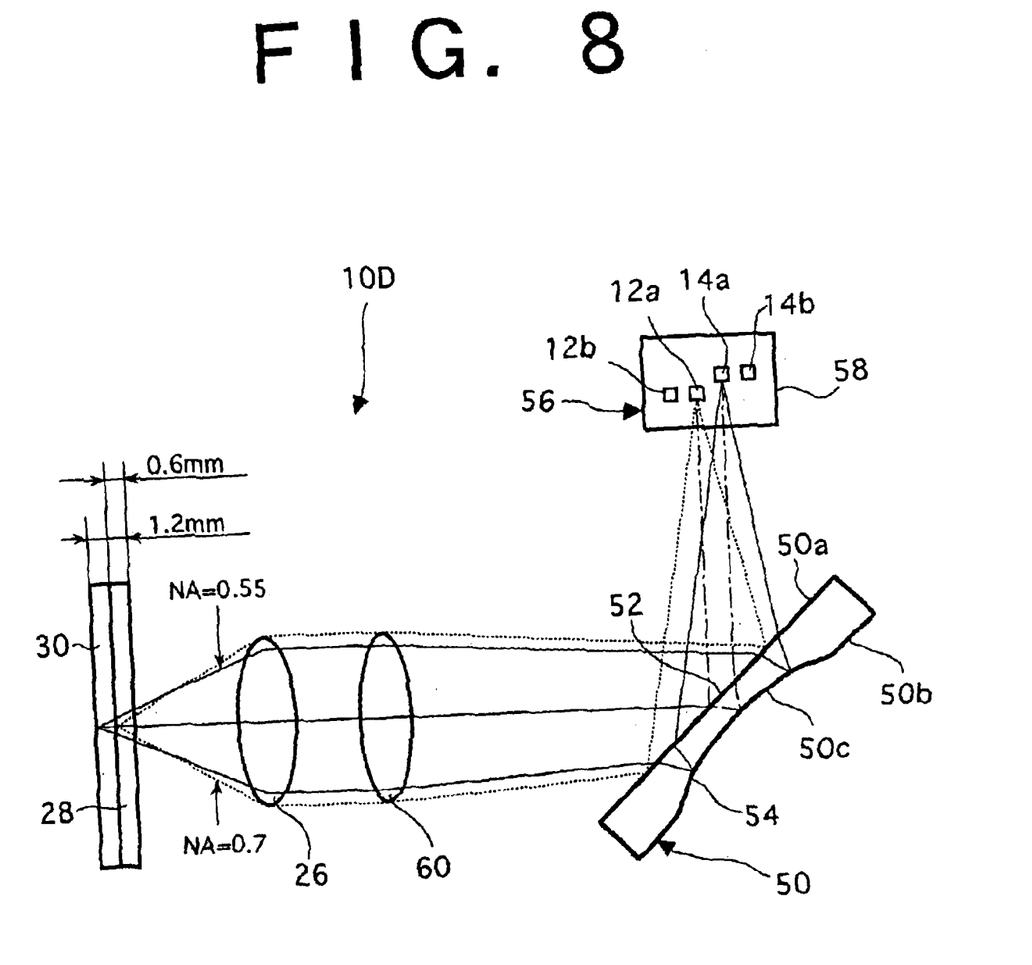
FIG. 8 is a schematic diagram of an optical pickup according to a fourth preferred embodiment of the present invention.

Referring to FIG. 8, there is shown a schematic diagram of an optical pickup 10D according to a fourth preferred embodiment of the present invention. This preferred embodiment employs a single integrated element unit 56 configured by providing first and second light emitting elements 12a and 14a and first and second photodetectors 12b and 14b on a common substrate 58. The first light emitting element 12a is located at the focal point of a collimator lens 60 for a wavelength of 410 nm. A plano-concave reflecting mirror 50 is located between the integrated element unit 56 and the collimator lens 60 obliquely with respect to the optical paths of the light beams emitted from the first and second light emitting elements 12a and 14a.

As in the third preferred embodiment mentioned above, the plano-concave reflecting mirror 50 has a first plane surface 50a on which the light beam emitted from the first or second light emitting element 12a or 14a is incident, a second peripheral plane surface 50b opposed to the first plane surface 50a, and a central concave surface 50c formed continuously to the second peripheral plane surface 50b and opposed to the first plane surface 50a. A wavelength-selective reflecting film 52 having a characteristic of reflecting a light beam having a wavelength of 410 nm and transmitting a light beam having a wavelength of 680 nm is formed on the first plane surface 50a of the plano-concave reflecting mirror 50. A total-reflection film 54 is formed on the second peripheral plane surface 50b and the central concave surface 50c of the plano-concave reflecting mirror 50.

The second light emitting element 14a is located on the substrate 58 at a specific position far from the focal point of the collimator lens 60 by a first predetermined distance in a first direction and spaced a second predetermined distance in a second direction perpendicular to the first direction so that the central ray of the light beam emitted from the second light emitting element 14a, refracted on the front surface of the plano-concave reflecting mirror 50, totally reflected on the back surface of the mirror 50, and refracted again on the front surface of the mirror 50 coincides with the optical axis of the collimator lens 60. In other words, the second light emitting element 14a is located at such a position that the light beam emitted from the second light emitting element 14a is converted into a collimated beam or a divergent or convergent beam near a collimated beam by the collimator lens 60.

The light beam emitted from the first light emitting element 12a is reflected by the wavelength-selective reflecting film 52 formed on the first plane surface 50a of the plano-concave reflecting mirror 50, and next converted into a collimated beam by the collimator lens 60. This collimated beam is focused on the recording surface of the optical disk 28 by the objective lens 26. On the other hand, the light beam emitted from the second light emitting element 14a is refracted on the front surface of the plano-concave reflecting mirror 50 and next reflected on the total-reflection film 54. At this time, the reflected light on the total-reflection film 54 is modulated to produce a rotationally symmetrical aberration as compensating for an aberration occurring on the recording surface of the optical disk 30 in focusing the light beam by the objective lens 26. The reflected light from the total-reflection film 54 is next refracted again on the front surface of the plano-concave reflecting mirror 50, and passed through the collimator lens 60 to enter the objective lens 26. Then, the light beam is focused on the recording surface of the optical disk 30 by the objective lens 26 to form a microscopic beam spot with no aberrations.

Figure 9:
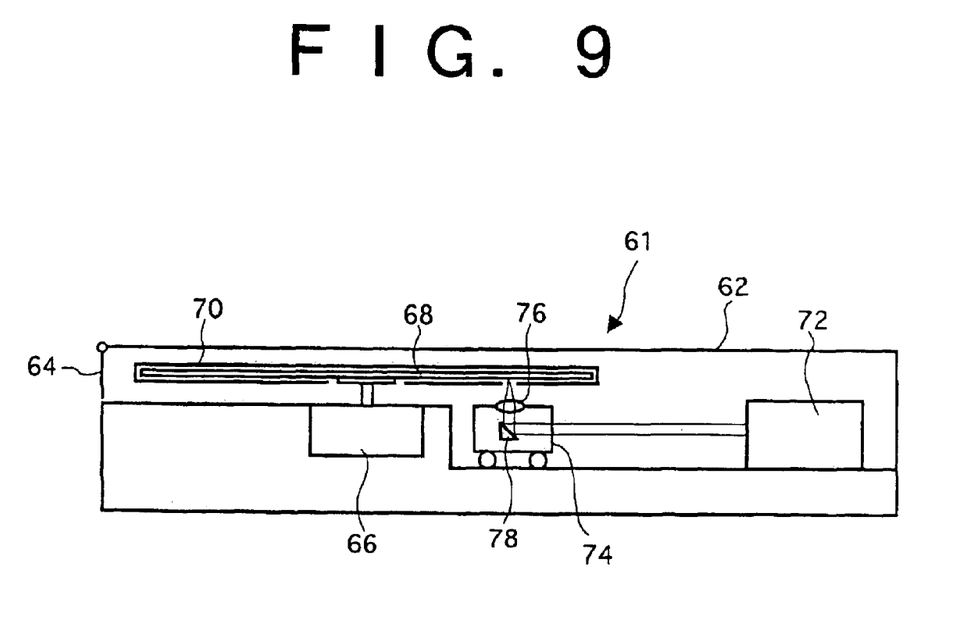
FIG. 9 is a schematic illustration of an optical storage device including the optical pickup according to the present invention.

Referring to FIG. 9, there is schematically shown an optical storage device 61 including the optical pickup according to the present invention. A spindle motor 66 is provided in a housing 62. When an optical disk cartridge 70 is inserted through an inlet door 64 into the housing 62, an optical disk 68 accommodated in the optical disk cartridge 70 is chucked by a hub of a rotating shaft of the spindle motor 66, thus loading the optical disk 68. A carriage 74 movable across the tracks of the optical disk 68 by a voice coil motor (VCM) is provided under the optical disk 68 in its loaded condition. An objective lens 76 and a beam raising prism 78 are mounted on the carriage 74.

A light beam from a light emitting element such as a laser diode provided in a fixed optical system 72 is reflected by the beam raising prism 78 to enter the objective lens 76. The light beam is next focused on a recording surface of the optical disk 68 by the objective lens 76 to form a beam spot on the recording surface. The objective lens 76 is movable along its optical axis by a focusing actuator, and is also movable across the tracks of the optical disk 68 by a tracking actuator.

The arrangement of the optical system in each preferred embodiment mentioned above may be suitably modified. The beam splitter may be replaced by a mirror for guiding the light beams to a common optical path. The optical path to each photodetector may be suitably modified. While the optical pickup of the present invention is applied to an optical disk drive in each preferred embodiment mentioned above, the optical pickup of the present invention may be applied also to any optical devices such as an optical card drive and an optical tape drive. Further, a magnetic storage device for recording and/or reproducing information by optically tracking a magnetic storage medium or by applying a thermal bias thereto in recent research is also defined as a kind of optical storage device in this specification.

According to the present invention, it is possible to provide an optical pickup which can form good beam spots with reduced aberrations on two kinds of optical storage media having different thicknesses without the needs for any mechanical moving mechanism and for exacting tolerances on positioning of the components. More specifically, in an optical pickup using an objective lens optimized for one of the two light emitting elements, an optical element for producing a rotationally symmetrical aberration compensating for an aberration occurring on an optical storage medium in using the other light emitting element and the objective lens is located on the back side (downstream side) of the other light emitting element, thereby allowing the formation of good beam spots on two kinds of optical storage media having different thicknesses and different operating wavelengths. Further, the light beam emitted from the other light emitting element and passed through the optical element for producing the aberration can be made close to a collimated beam, so that the incident angle dependence of the beam splitter can be neglected. As a result, the optical system can be easily laid out, and the optical pickup and the optical storage device can be made compact.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical storage device capable of at least reproducing information recorded on first and second optical storage media different in distance from a medium surface on which a light beam is incident to a recording surface and in operating wavelength, said optical storage device comprising:
    a first light emitting element for emitting a light beam having a first wavelength;
    a second light emitting element for emitting a light beam having a second wavelength different from said first wavelength;
    a first photodetector for detecting a reproduction signal from a light beam reflected on said first optical storage medium;
    a second photodetector for detecting a reproduction signal from a light beam reflected on said second optical storage medium;
    a first optical element for combining optical paths of said light beams emitted from said first and second light emitting elements;
    a first collimator lens located between said first light emitting element and said first optical element for collimating said light beam emitted from said first light emitting element;
    a second collimator lens located between said second light emitting element and said first optical element for collimating said light beam emitted from said second light emitting element;
    an objective lens located commonly on said optical paths combined by said first optical element for optimally focusing said light beam emitted from said first light emitting element onto said first optical storage medium;
    a second optical element located between said second light emitting element and said first optical element for producing a rotationally symmetrical aberration compensating for an aberration occurring on said second optical storage medium, in said light beam emitted from said second light emitting element; and
    an aperture limiting member for limiting the diameter of said light beam emitted from said second light emitting element.

2. An optical storage device according to claim 1, wherein said first optical element comprises a beam splitter.

3. An optical storage device according to claim 1, wherein said second optical element comprises an optical element for converting said light beam emitted from said second light emitting element into a light beam having a central ray lying on the optical axis of said optical element and outermost peripheral rays parallel to or nearly parallel to said central ray.

4. An optical storage device according to claim 1, wherein said second optical element comprises a plano-concave lens having a first plane surface on which said light beam collimated by said second collimator lens is incident, a second peripheral plane surface opposed to said first plane surface, and a central concave surface formed continuously to said second peripheral plane surface and opposed to said first plane surface;
    peripheral rays of said light beam collimated by said second collimator lens being passed through said second peripheral plane surface of said plano-concave lens, the remaining rays being passed through said central concave surface of said plano-concave lens.

5. An optical storage device according to claim 4, wherein said aperture limiting member comprises a lens holder for holding said plano-concave lens.

6. An optical storage device according to claim 1, wherein said second collimator lens has the same focal length as that of said first collimator lens, and said second light emitting element is located at a position far from the focal point of said second collimator lens by a predetermined distance.

7. An optical storage device capable of at least reproducing information recorded on first and second optical storage media different in distance from a medium surface on which a light beam is incident to a recording surface and in operating wavelength, said optical storage device comprising:

a first light emitting element for emitting a light beam having a first wavelength;

a second light emitting element for emitting a light beam having a second wavelength different from said first wavelength;

a first photodetector for detecting a reproduction signal from a light beam reflected on said first optical storage medium;

a second photodetector for detecting a reproduction signal from a light beam reflected on said second optical storage medium;

an optical element for combining optical paths of said light beams emitted from said first and second light emitting elements;

a first collimator lens located between said first light emitting element and said optical element for collimating said light beam emitted from said first light emitting element;

a second collimator lens located between said second light emitting element and said optical element for collimating said light beam emitted from said second light emitting element;

an objective lens located commonly on said optical paths combined by said optical element for optimally focusing said light beam emitted from said first light emitting element onto said first optical storage medium;

a plano-concave reflecting mirror located between said optical element and said objective lens obliquely with respect to said optical paths combined by said optical element, said plano-concave reflecting mirror having a first plane surface on which said light beam collimated by said first or second collimator lens is incident, a second peripheral plane surface opposed to said first plane surface, and a central concave surface formed continuously to said second peripheral plane surface and opposed to said first plane surface; and an aperture limiting member for limiting the diameter of said light beam emitted from said second light emitting element;

said plano-concave reflecting mirror further having a wavelength-selective reflecting film formed on said first plane surface for selectively reflecting said light beam having said first wavelength and transmitting said light beam having said second wavelength and a total-reflection film formed on said second peripheral plane surface and said central concave surface;

said plano-concave reflecting mirror producing a rotationally symmetrical aberration compensating for an aberration occurring on said second optical storage medium, in said light beam emitted from said second light emitting element.

8. An optical storage device according to claim 7, wherein said optical element comprises a beam splitter.

9. An optical storage device according to claim 7, wherein peripheral rays of said light beam collimated by said second collimator lens are reflected on said second peripheral plane surface of said plano-concave reflecting mirror, and the remaining rays are reflected on said central concave surface of said plano-concave reflecting mirror.

10. An optical storage device capable of at least reproducing information recorded on first and second optical storage media different in distance from a medium surface on which a light beam is incident to a recording surface and in operating wavelength, said optical storage device comprising:

a first light emitting element provided on a substrate for emitting a light beam having a first wavelength;

a second light emitting element provided on said substrate for emitting a light beam having a second wavelength different from said first wavelength;

a first photodetector provided on said substrate for detecting a reproduction signal from a light beam reflected on said first optical storage medium;

a second photodetector provided on said substrate for detecting a reproduction signal from a light beam reflected on said second optical storage medium;

a collimator lens for collimating said light beam emitted from said first light emitting element;

an objective lens located downstream of said collimator lens for optimally focusing said light beam emitted from said first light emitting element onto said first optical storage medium; and a plano-concave reflecting mirror located between said first and second light emitting elements and said collimator lens obliquely with respect to optical paths of said light beams emitted from said first and second light emitting elements, said plano-concave reflecting mirror having a first plane surface on which said light beam emitted from said first or second light emitting element is incident, a second peripheral plane surface opposed to said first plane surface, and a central concave surface formed continuously to said second peripheral plane surface and opposed to said first plane surface;

said plano-concave reflecting mirror further having a wavelength-selective reflecting film formed on said first plane surface for selectively reflecting said light beam having said first wavelength and transmitting said light beam having said second wavelength and a total-reflection film formed on said second peripheral plane surface and said central concave surface;

said second light emitting element being located at a position far from the focal point of said collimator lens by a first predetermined distance in a first direction and spaced a second predetermined distance in a second direction perpendicular to said first direction so that the central ray of said light beam emitted from said second light emitting element and next reflected by said plano-concave reflecting mirror coincides with the optical axis of said collimator lens.

11. An optical storage device according to claim 10, wherein peripheral rays of said light beam emitted from said second light emitting element are reflected on said second peripheral plane surface of said plano-concave reflecting mirror, and the remaining rays are reflected on said central concave surface of said plano-concave reflecting mirror.

* * * * *